Sept. 4, 1923.
R. A. FONTAINE
SPEED CHANGING GEARING
Filed May 2, 1921
1,466,933
3 Sheets-Sheet 1
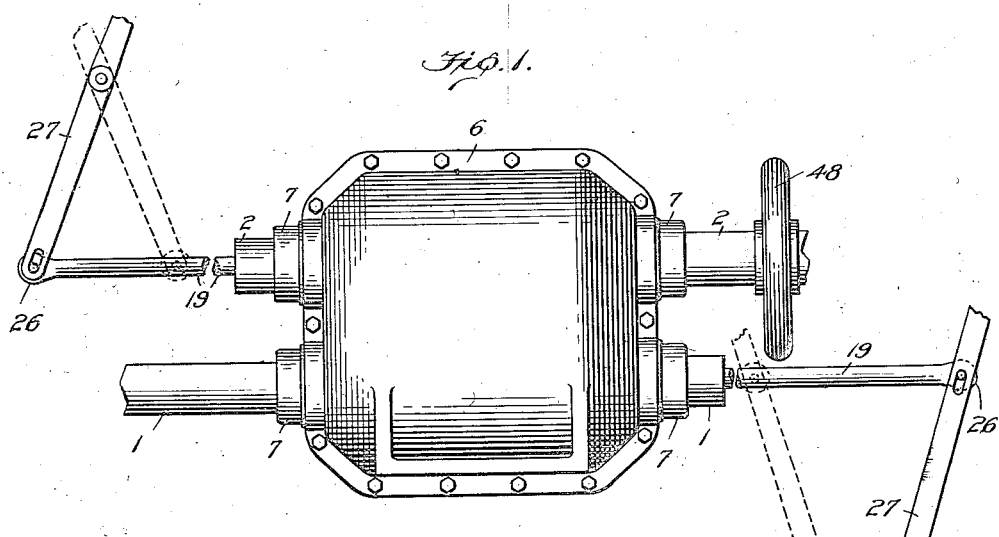
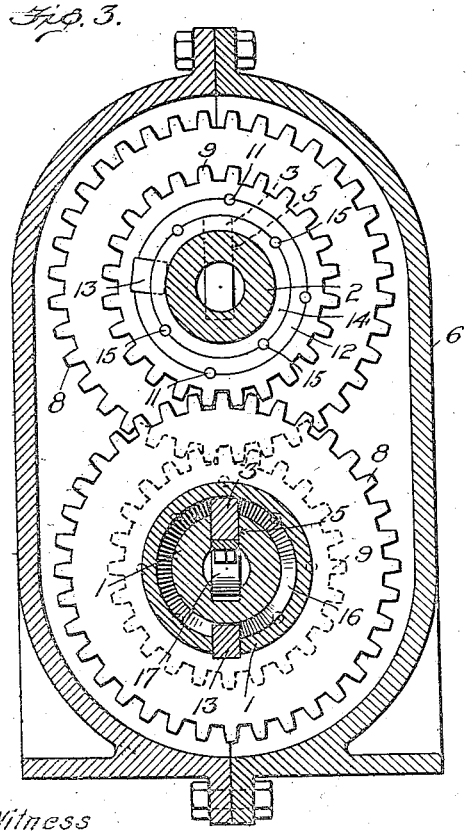
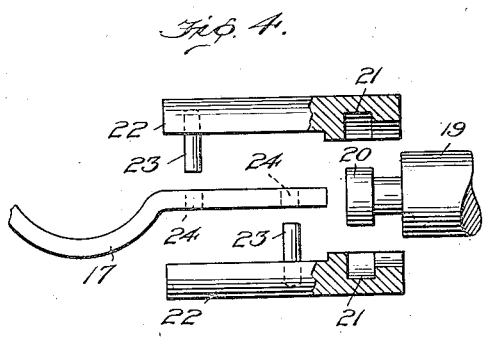
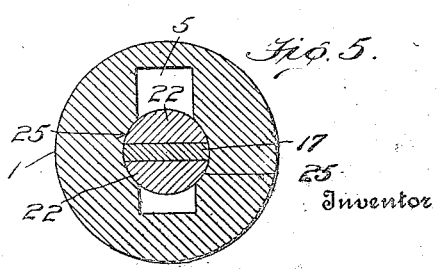

Sept. 4, 1923.
R. A. FONTAINE
SPEED CHANGING GEARING
Filed May 2, 1921
1,466,933
3 Sheets-Sheet 2

Witness
Edwin L. Bradford

Inventor
Robert A. Fontaine
By his Attorney

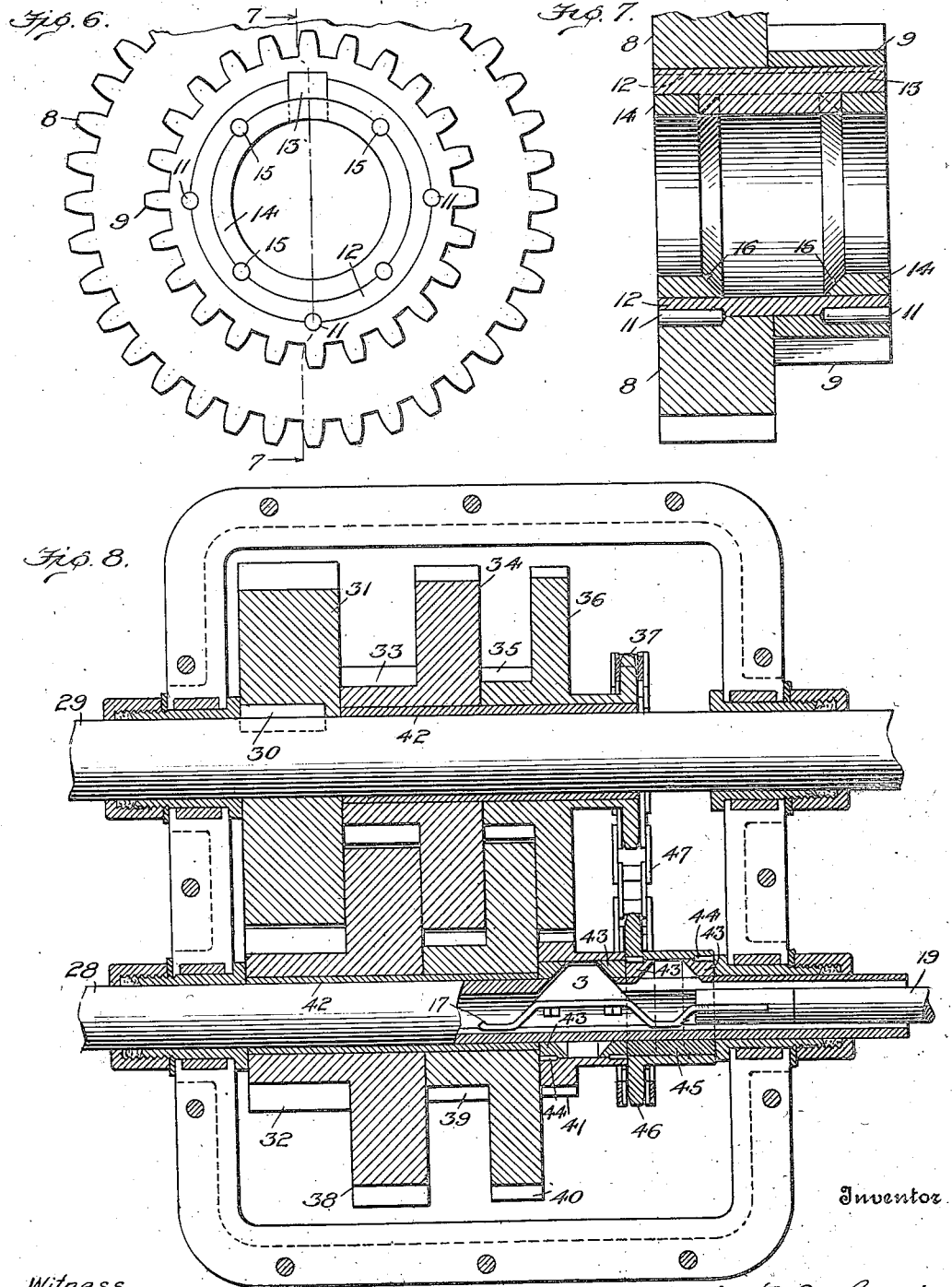

Patented Sept. 4, 1923.

1,466,933

UNITED STATES PATENT OFFICE.

ROBERT A. FONTAINE, OF MARTINSVILLE, VIRGINIA.

SPEED-CHANGING GEARING.

Application filed May 2, 1921. Serial No. 466,118.

*To all whom it may concern:*

Be it known that I, ROBERT A. FONTAINE, a citizen of the United States, residing at Martinsville, in the county of Henry and State of Virginia, have invented certain new and useful Improvements in Speed-Changing Gearing; and I do hereby declare the following to be a full, clear, and exact description of the invention, such as will enable others skilled in the art to which it appertains to make and use the same.

My invention relates to a speed changing gearing suitable for use in power transmission mechanisms where it is desired to effect a change of speed without stopping or disconnecting the motor.

A speed changing gearing constructed in accordance with my invention while capable of general application to various kinds of devices, is especially well adapted for use in conjunction with lathes, drills and automobile engines. As will be perceived from the drawings, the invention is not alone applicable to the transmission of power from one shaft to a parallel shaft by means of gears, but may also be embodied in mechanism involving the use of sprockets or pulleys and suitable connecting belting.

The principal feature of the invention, generally stated, resides in mounting a plurality of gears upon each of two parallel shafts and in providing means for selectively connecting each of the gears to the shaft upon which it is mounted, certain of the gears on each shaft being connected in pairs to rotate relatively to each other, and the corresponding gears on the said shafts being at all times in mesh.

A further feature of the invention consists in employing a plurality of hollow parallel shafts having openings through their peripheries and in loosely mounting upon each of said shafts a plurality of gears, the said gears being adapted to be selectively connected to their respective shafts by a plurality of spring pressed keys each of which is slidably mounted within one of said shafts in such manner that it may be caused to project at will through the peripheral opening in the shaft with which it is associated and thereby cause the neighboring gear to be coupled to the shaft.

There are other features of the invention residing in particular combinations and in details of contruction all as will hereinafter appear.

In the drawings chosen for the purpose of illustrating the invention, the scope whereof is pointed out in the claims,—

Figure 1 is a side elevation of a speed changing gearing embodying the invention and of the preferred means by whch it is manually controlled.

Figure 3 is a section on the line 3—3, Fig. 2.

Figure 4 is a detail view, partly in elevation and partly in section, showng the manner of connecting the key operating means with the keys by which the gears are selectively coupled to their respective shafts.

Figure 5 is a detail sectional view on the line 5—5, Fig. 2.

Figure 6 is a detail view in elevation of a pair of rigidly connected gears with which the mechanism is provided.

Figure 7 is a detail section on the line 7—7, Fig. 6.

Figure 8 is a view correponding to Fig. 2 but illustrating a modified form of my invention in which sprocket pulleys and their connecting belts are embodied in the construction.

Figure 2:
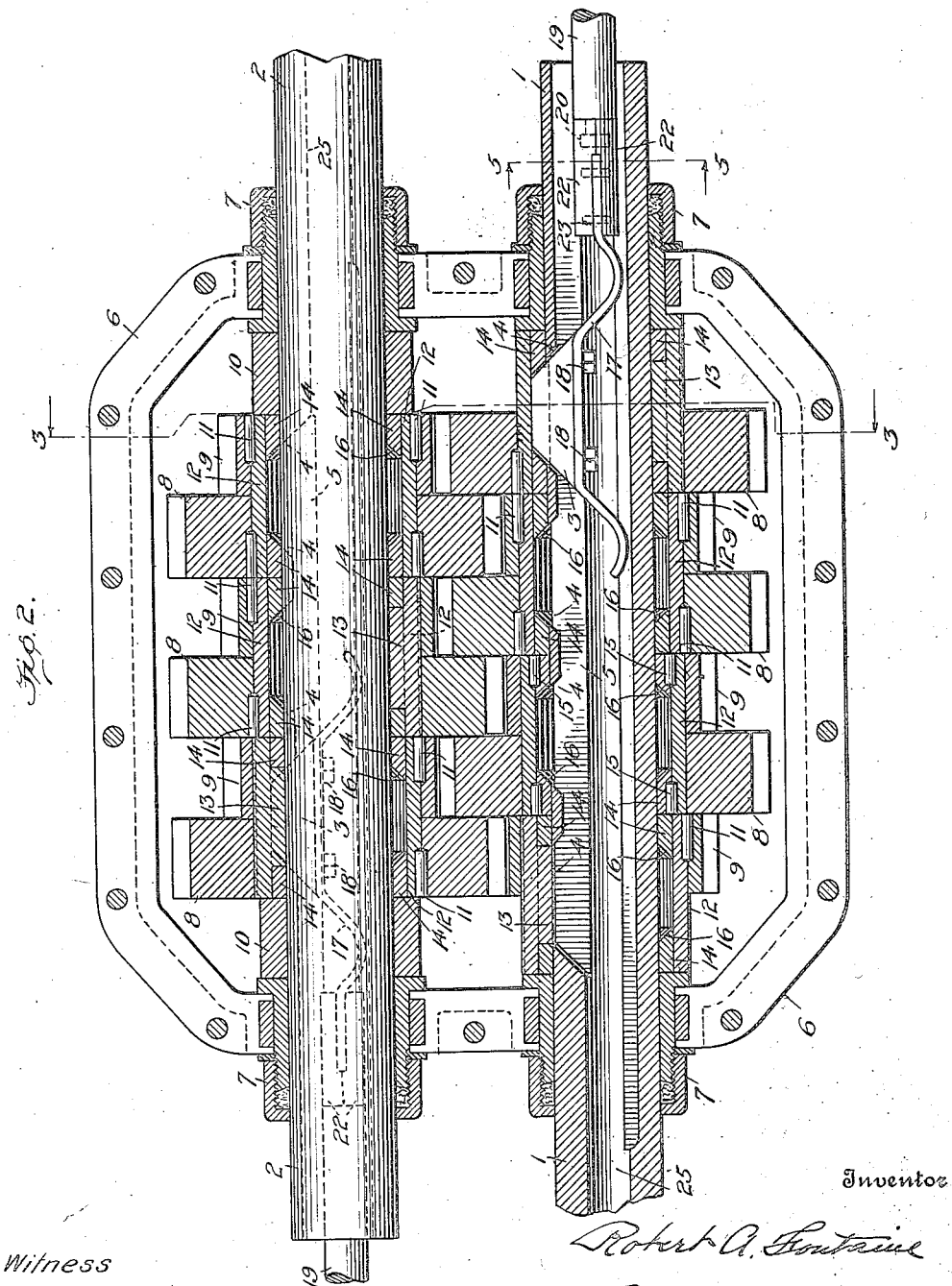
Figure 2 is a detail vertical section of the speed changing gearing illustrated in Fig. 1, the fly wheel and manually operated controlling means being omitted and one of the shafts being shown in elevation.

In the drawings, 1 and 2 respectively indicate a pair of parallel revoluble shafts each of which is made of hollow form to receive a key 3 which is adapted to project outwardly beyond the periphery of the shaft with which it is associated, each of said shafts for this latter purpose being provided with suitable peripheral openings 4 which communicate with the interior of their respective shafts. Each shaft has a longitudinal channel 5 into which the adjacent key 3 closely fits, so that each key is compelled to rotate with its shaft.

The shafts 1 and 2 may be suitably journaled in a two-part housing 6, the journal bearings referably being formed as stuffing boxes 7 which are interposed between the sections of the housing.

A plurality of gears is loosely mounted upon each of the shafts. The succeeding gears on each shaft are of different diameters, large and small gears alternating with each other. In the particular form of construction illustrated in the drawings gears of only two different diameters are employed, each shaft bearing three large gears 8 and three smaller gears 9. It will be understood, of course, that the size of the gears and the number employed may be varied to suit special circumstances.

The gears or power transmission means 8 upon one shaft are at all times in mesh with the gears or power transmission means 9 upon the other shaft. Suitable spacing sleeves 10 may be mounted upon the shaft 2 to maintain its gears in meshing relation with the gears of the shaft 1.

Each gear 8 and an adjacent gear 9 are rigidly connected by means of pins or keys 11 to a split annulus 12 through the split of which a clutch lug 13 projects toward the neighboring shaft. The annulus 12 and clutch lug 13 in effect constitute a shouldered sleeve by which neighboring gears 8 and 9 upon each shaft are rigidly connected in pairs.

Interposed between the respective split rings 12 and the corresponding shafts are a plurality of bearing rings 14. These rings, which are loosely mounted upon their respective shafts, are arranged in pairs, the rings of each pair being spaced from each other and being rigidly connected by means of keys or pins 15 to the annulus 12 by which they are encircled. The rings 14 of each pair are maintained in spaced relation by the respective clutch lugs 13 which project therebetween.

The opposed faces of each pair of rings is beveled, as indicated at 16, to correspond to the oppositely beveled faces of the corresponding sliding keys 3. This beveling of the faces of the bearing rings 14 and the corresponding beveling of the keys 3 permits the latter to be readily shifted along their respective shafts so as to release them from driving engagement with the mating clutch lugs 13.

Each key 3 is normally maintained in operative or driving position by a bar spring 17 which is rigidly secured to the adjacent key by cap screws 18. Each spring 17 may be formed with curved portions which are disposed upon opposite sides of the key and are adapted to bear against the interior surface of the neighboring revoluble shaft. The outer end of each spring is preferably connected to the adjacent operating rod 19 by which the associated key is manually shifted, in a manner permitting said rods to be unaffected by the rotation of the shafts 1 and 2. To this end each of the rods 19 may be provided at its inner end with a cylindrical axial stud having a cylindrical head 20 which latter is adapted to extend into corresponding semicircular bearing grooves 21 formed in a pair of similar bars 22 between which the outer end of the adjacent spring 17 extends and to which said spring is secured without capability of rotation with respect thereto. The spring 17 may be conveniently secured to the adjacent clamping bars 22 by providing the latter with pins or lugs 23 which are adapted to extend through corresponding apertures 24 in the spring. The clamping bars are made as cylindrical segments and together with the portion of the spring clamped between them form a cylindrical unit which fits closely within the bore 25 of the neighboring shaft. When in assembled position the engagement of the clamping bars 22 with the neighboring shaft serves to maintain them in connected relation with the spring 17 and with the adjacent operating rod 19. The outer end of each of the operating rods may be formed with a perforated lug 26 affording means for attaching a suitable operating lever 27 or other desired device for shifting the rods 19 longitudinally with respect to the corresponding shafts, 1 and 2, respectively.

The construction shown in Fig. 8 is a modification of my invention showing the manner of employing sprocket wheels as power transmission elements for communicating the rotation of a revoluble shaft to a parallel shaft in a speed changing mechanism, the construction here illustrated being one in which the sprocket wheels are employed to cause both shafts to rotate in the same direction. In this form of my invention 28 and 29 respectively indicate the parallel revoluble shafts, the former being hollow and the latter being solid. As shown, the shafts 28 and 29 may be journaled in a casing in substantially the same manner as the shafts 1 and 2 of the construction hereinbefore described.

Rigidly mounted upon the shaft 29, as by means of a key 30, is a gear 31 which is continuously in mesh with a smaller gear 32 revolving loosely upon the hollow shaft 28. Journaled upon the shaft 29 is a bearing sleeve 42 upon which are revolubly mounted gears 33, 34, 35 and 36 and a sprocket wheel 37. The gears 33 and 34 are rigidly united to rotate together, and the gears 35 and 36 and the sprocket wheel 37 are similarly attached so that they too rotate as a unit. The several gears 33, 34, 35 and 36 constantly mesh, respectively, with gears 38, 39, 40 and 41 mounted upon the shaft 28. The gears 32, 38, 39 and 40 are connected in pairs, that is to say, the gears 32 and 38 are rigidly united and the gears 39 and 40 are similarly united, both pairs of gears being adapted to revolve at different rates. A revoluble bearing sleeve 42 is preferably interposed between the shaft 28 and the gears 32, 38, 39 and 40.

The gear 41, which meshes with the gear 36 upon the shaft 29, is mounted upon split beveled bearing rings 43, the said gear being secured to said rings by means of pins or keys 44. A clutch lug 45 is located in the splits of the neighboring bearing rings 43 and projects between said rings so as to be capable of engaging the adjacent bevel key 3. The sprocket wheel 46, which is adapted to rotate upon the shaft 28 relatively to the gear 41, is mounted upon said shaft in the same manner that the gear 41 is mounted thereon, that is to say, a pair of split beveled bearing rings 43 is interposed between the sprocket wheel and the shaft, and the said rings are spaced apart by a clutch lug 45 which is located in the splits of the rings and is adapted to engage the slidable key 3. Pins or keys 44 serve to secure the sprocket wheel 46 rigidly to the adjacent bearing rings. The sprocket wheels 37 and 46 are belted together by means of a sprocket chain 47.

The key 3, its actuating spring 17, the key operating rod 19 and the separable clamping members 22 by which the spring pressed key is revolubly connected to the operating rod, correspond in form and function to the correspondingly numbered parts which heretofore have been described.

The shaft 2 may be provided with a fly wheel 48 so that when changing from one speed to another only the difference in the rate of rotation of the gears successively coupled to the shaft 2 need be taken into account.

The wide range of changes in speed which may be accomplished by a mechanism constructed in accordance with my invention will be readily appreciated. Thus, let it be assumed that the gear ratio of the gears 8 and 9 shown in the principal figures of the drawings is 1 to 2, and that the shaft 1 has a speed of 2000 revolutions per minute. If the appropriate operating rod 19 is properly manipulated to shift its key 3 along the shaft until the gear 8 at the right hand end of the mechanism is connected to said shaft, then the successive pairs of connected gears 8 and 9 from right to left upon the shaft 2 will be caused to rotate at the following respective speeds: 4000 revolutions per minute; 16000 revolutions per minute; and 64000 revolutions per minute. As any pair of gears upon the shaft 2 may be selectively connected to said shaft by properly positioning the associated key 3, it will be perceived that this shaft may be caused to revolve either at the rate of 4000 revolutions per minute or 16000 revolutions per minute or 64000 revolutions per minute. If it is desired that the shaft 2 be rotated at less than 2000 revolutions per minute the key 3 associated with the shaft 1 may be slid lengthwise of said shaft until, for example, the gear 9 at the left hand end of Fig. 2 is connected to the shaft 1. In such a case the several pairs of gears 8 and 9 from left to right upon the shaft 2 will be caused to rotate at the following respective rates: 1000 revolutions per minute; 250 revolutions per minute, and 62½ revolutions per minute. By means of the appropriate sliding key 3 any one of these pairs of gears 8 and 9 may be operatively connected to the shaft 2 to cause the latter to have a corresponding rate of rotation. Various other changes in rates of speed may obviously be effected by connecting different gears to the shafts upon which they are mounted. Other speed ratios may, of course, be obtained by employing gears having a different ratio from that assumed.

It is believed that the mode of operation of the modified form of the invention shown in Fig. 8 will be readily understood from the foregoing description, but it may be added that when the gear 41 is coupled to the shaft 28 the parallel shafts 28 and 29 will rotate in opposite directions, while said shafts may be caused to rotate in the same direction by coupling the sprocket wheel 46 to its shaft.

I claim:—

1. In a speed changing gearing, the combination with a plurality of revoluble parallel shafts, of a plurality of gears loosely mounted upon each shaft, means for maintaining said shafts against longitudinal movement, and means for selectively connecting each of said gears to the shaft upon which it is mounted, each of the gears upon one shaft meshing with a corresponding one of the gears upon the other shaft, and certain of the gears on each shaft being rigidly connected to rotate together.

2. In a speed changing gearing, the combination with a plurality of revoluble parallel shafts, of a plurality of gears loosely mounted upon each shaft, and means for selectively connecting each of said gears to the shaft upon which it is mounted, said means being independently movable longitudinally of said shafts, certain of the gears on each shaft being rigidly connected in pairs to rotate together, and the gears of a pair upon one shaft being respectively in mesh with gears of a plurality of adjacent pairs mounted on the other shaft.

3. In a speed changing gearing, the combination with a plurality of revoluble parallel shafts, of a plurality of gears mounted upon each shaft, means for connecting one of said gears to its shaft, said means being independently movable longitudinally of said shaft, and means for connecting said other shaft to and disconnecting it from at least one of the gears mounted thereon, the gears upon one shaft being continuously in mesh with the corresponding gears upon the other shaft, and certain of the gears on each shaft being rigidly connected to revolve together.

4. In a speed changing gearing, the combination with a plurality of revoluble parallel shafts, a plurality of gears mounted upon each shaft, certain of said gears on each shaft being rigidly connected to revolve together upon their respective shafts, and the corresponding gears on said shafts being continuously in mesh, means carried by one of said shafts and independently movable longitudinally thereof for causing the rotation of a pair of said rigidly connected gears loosely mounted on the other shaft, and means for causing one of said gears to revolve at the same rate as said last named shaft.

5. In a speed changing gearing, the combination with a plurality of revoluble shafts, of a plurality of gears mounted upon each of said shafts, and means for connecting at least one of said gears on each shaft to the shaft on which it is mounted, said means being respectively carried by and independently movable longitudinally of the respective shafts, the gears on one of said shafts being continuously in mesh with the respective gears on the other shaft, certain of said gears on each shaft being rigidly connected to rotate together, and alternate gears upon each shaft being adapted to rotate relatively to each other.

6. In a speed changing gearing, the combination with a plurality of revoluble shafts, of a plurality of gears loosely mounted upon each of said shafts, the said gears upon one shaft being continuously in mesh with the respective gears upon the other shaft, and means for selectively connecting each of said gears to the shaft upon which it is mounted, certain adjacent gears on each shaft being adapted to rotate at the same rate, and alternate gears upon each shaft being adapted to rotate relatively to each other.

7. In a speed changing gearing, the combination with a plurality of hollow parallel shafts, of a plurality of gears loosely mounted upon each of said shafts, the said gears upon one shaft being continuously in mesh with the respective gears upon the other shaft, and means movable within the said hollow shafts for selectively connecting said gears to their respective shafts.

8. In a speed changing gearing, the combination with a plurality of parallel revoluble shafts, of a plurality of gears loosely mounted on each of said shafts, some of said gears on each shaft being rigidly connected and some of said gears on each shaft being adapted to rotate relatively to each other on the shaft upon which they are mounted, means for connecting at least one of said gears upon one shaft to its shaft, said means being mounted within said shaft and independently movable longitudinally thereof, and means for connecting at will to said other shaft one of said gears mounted thereon, whereby a plurality of gears upon each shaft are caused to revolve with respect to each other, the several gears upon one shaft being continuously in mesh with the respective gears on the other shaft.

9. In a speed changing gearing, the combination with a plurality of parallel revoluble shafts one of which is hollow, of means for driving one shaft from the other at a different speed, said means involving a plurality of gears mounted upon each of said shafts, said gears upon one shaft continuously meshing with the respective gears upon the other shaft, certain of said gears upon each shaft being rigidly connected to rotate together and alternate gears upon each shaft being adapted to rotate relatively to each other, means movable within said hollow shaft for connecting one of said gears to said hollow shaft, and means for connecting one of said gears upon the other shaft to its shaft.

10. In a speed changing gearing, the combination with a plurality of revoluble parallel shafts, of means for driving one shaft from the other, said means involving a plurality of relatively rotable power transmission means loosely mounted upon each shaft, said power transmission means upon one shaft being respectively adapted to cause the rotation of said power transmission means on the other shaft, means for connecting at least one of said power transmission means to the shaft upon which it is mounted, and means for selectively connecting to the other shaft one or another of a plurality of said transmission means mounted on said last named shaft, said last named means being mounted within and independently movable of said shaft.

11. In a speed changing gearing, the combination with a plurality of hollow parallel shafts having openings through their peripheries, of a plurality of gears loosely mounted upon each of said shafts, and means movable within said hollow shafts for selectively connecting said gears to their respective shafts, said means involving a plurality of spring pressed keys, each of said shafts having one of said keys mounted therein, and each of said keys being adapted to project through said peripheral opening in the shaft with which it is associated.

12. In a speed changing gearing, the combination with a plurality of parallel hollow shafts having openings through their peripheries, of a plurality of gears loosely mounted on each of said shafts, a plurality of shouldered sleeves interposed between said shafts and corresponding pairs of adjacent gears on each shaft, means for rigidly connecting each of said pairs of gears with the said sleeve adjacent thereto, a plurality of spaced bearing rings interposed between each of said sleeves and the respective shafts, and a plurality of spring pressed keys movably mounted within the respective shafts and adapted selectively to connect said gears to their respective shafts, each of said keys being adapted to project through said peripheral opening in the shaft with which it is associated and being adapted to have driving engagement with said shouldered sleeves mounted on said last named shaft.

13. In a speed changing gearing, the combination with a plurality of parallel hollow shafts having peripheral openings therein, of a plurality of beveled bearing rings journaled on each shaft, said rings being arranged in pairs and the rings of each pair being spaced from each other along the shaft upon which they are mounted, a plurality of sleeves mounted on each of said shafts, each of said sleeves being in encircling relation to a neighboring pair of said rings and each being provided with a clutch lug extending between said rings toward the adjacent shaft, a plurality of gears mounted upon each of said sleeves, means for rigidly securing said gears to their respective sleeves, and means for selectively connecting each of said sleeves to its shaft, said last named means involving a plurality of beveled keys, each of said keys being arranged within one of said shafts and being adapted to project beyond the periphery thereof so as to have selective driving engagement with the clutch lugs of the adjacent sleeves.

14. In a speed changing gearing, the combination with a plurality of parallel hollow shafts having peripheral openings therein, of a plurality of beveled bearing rings journaled on each shaft, said rings being arranged in pairs and the rings of each pair being spaced from each other along the shaft upon which they are mounted, a plurality of sleeves mounted on each of said shafts, each of said sleeves being in encircling relation to a pair of said rings and including a split annulus and a clutch lug projecting through the split in said annulus and extending between adjacent spaced bearing rings toward the neighboring shaft, a plurality of gears mounted upon each of said sleeves, means for rigidly securing said gears to their respective sleeves, and means for selectively connecting each of said sleeves to its respective shaft, said last named means involving a plurality of spring pressed keys which are beveled to correspond to said beveled bearing rings, said keys being movably mounted in the respective shafts and each being adapted selectively to engage the clutch lugs of the sleeves associated with the corresponding shaft.

15. In a speed changing gearing, the combination with a plurality of parallel revoluble shafts one of which is hollow, of a plurality of gears revolubly mounted upon each of said shafts, means for connecting at least one of said gears to the shaft upon which it is mounted, means within said hollow shaft and rotatable therewith for connecting at least one of said gears to said hollow shaft, and means movable in the direction of length of said hollow shaft and unaffected by the rotation thereof for shifting said last named means at will either to operative position or to inoperative position.

In testimony whereof I affix my signature.

ROBERT A. FONTAINE.